United States Patent
Khanna et al.

(10) Patent No.: US 11,652,688 B2
(45) Date of Patent: May 16, 2023

(54) PREDICTING USAGE PATTERN OF SERVERLESS ENVIRONMENT VIA MACHINE LEARNING

(71) Applicant: International Business Machines Corporation, Armonk, NY (US)

(72) Inventors: Rashmi Khanna, Bangalore (IN); Magesh Kumar Sivaswamy, Bangalore (IN); Sanjay Kumar Verma, Bengaluru (IN); Sanjay Singh, Pune (IN); Manesh Chandran Nambiar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 17/104,115

(22) Filed: Nov. 25, 2020

(65) Prior Publication Data

US 2022/0166670 A1    May 26, 2022

(51) Int. Cl.
*H04L 41/0816* (2022.01)
*H04L 41/147* (2022.01)
*H04L 41/16* (2022.01)
*H04L 67/10* (2022.01)

(52) U.S. Cl.
CPC ........ *H04L 41/0816* (2013.01); *H04L 41/147* (2013.01); *H04L 41/16* (2013.01); *H04L 67/10* (2013.01)

(58) Field of Classification Search
CPC .................................................. H04L 41/147
See application file for complete search history.

(56) References Cited

U.S. PATENT DOCUMENTS

| | | | |
|---|---|---|---|
| 9,652,732 B1* | 5/2017 | Barstad | G06Q 10/0837 |
| 10,575,077 B2* | 2/2020 | Yang | H04R 9/045 |
| 2010/0114554 A1* | 5/2010 | Misra | G06Q 10/00 703/22 |
| 2014/0325361 A1* | 10/2014 | Lee | G06Q 10/10 715/730 |
| 2017/0026282 A1* | 1/2017 | Huang | H04W 8/005 |
| 2017/0223005 A1* | 8/2017 | Birgisson | H04L 63/083 |
| 2018/0010818 A1* | 1/2018 | Maruyama | F24F 11/30 |
| 2018/0349168 A1 | 12/2018 | Ahmed | |

(Continued)

FOREIGN PATENT DOCUMENTS

| | | |
|---|---|---|
| EP | 35029831 A1 | 6/2019 |
| JP | 2018067302 A | 4/2018 |

OTHER PUBLICATIONS

Alqaryouti et al., "Serveriess Computing and Scheduling Tasks on Cloud: A Review", American Scientific Research Journal for Engineering, Technology, and Sciences (ASRJETS), 2018, vol. 40, No. 1, pp. 235-247.

(Continued)

*Primary Examiner* — Nicholas R Taylor
*Assistant Examiner* — Sm Z Islam
(74) *Attorney, Agent, or Firm* — Monchai Chuaychoo (57) ABSTRACT

An approach for updating one or more serverless runtime configurations based on predicting usage patterns of a serverless computing cluster is disclosed. The approach includes collecting one or more attributes associated with an application on a serverless computing cluster and a user of the application and analyzing the one or more collected attributes. Furthermore, the approach includes predicting one or more usage patterns based the analyzing and updating one or more serverless runtime configurations based on the one or more usage patterns.

16 Claims, 5 Drawing Sheets

(56) References Cited

U.S. PATENT DOCUMENTS

| | | | | |
|---|---|---|---|---|
| 2019/0155577 | A1* | 5/2019 | Prabha | G06F 11/302 |
| 2019/0303211 | A1 | 10/2019 | Dias | |
| 2020/0073717 | A1* | 3/2020 | Hari | G06F 9/5061 |
| 2020/0162472 | A1* | 5/2020 | Zadeh | G06F 8/71 |
| 2020/0218940 | A1* | 7/2020 | Anglin | H04L 9/0637 |
| 2021/0263779 | A1* | 8/2021 | Haghighat | G06F 9/5061 |

OTHER PUBLICATIONS

Bhattcharjee et al., "Efficient and Scalable Serverless Serving System for Deep Learning Prediction Services", arXiv:1904.01576v2 [cs.DC], Apr. 11, 2019, 11 pages.

Jackson, Keilan, "Fargate vs. Lambda: Serverless in AWS", Blue Matador, Jun. 16, 2020, 6 pages, <https://www.bluematador.com/blog/serverless-in-aws-lambda-vs-fargate>.

Taherizadeh et al., "Dynamic Multi-level Auto-scaling Rules for Containerized Applications," The British Computer Society 2018, Section B: Computer and Communications Networks and Systems, The Computer Journal, vol. 62 No. 2, 2019, Advance Access Publication on May 8, 2018, 24 pages.

Thommes, Markus, "Squeezing the milliseconds: How to make serverless platforms blazing fast!", Medium.com, Apr. 20, 2017, 7 pages, <https://medium.com/openwhisk/squeezing-the-milliseconds-how-to-make-serveriess-platforms-blazing-fast-aea0e9951bd0>.

Totoy et al., "An Extensible Scheduler for the OpenLambda FaaS Platform", Min-Move'18, Mar. 2018, Williamsburg, VA, 4 pages.

* cited by examiner

PREDICTING USAGE PATTERN OF SERVERLESS ENVIRONMENT VIA MACHINE LEARNING

BACKGROUND

The present invention relates generally to the field of resource allocation techniques for a shared computing environment, and more particularly, to allocation resources for serverless technologies by leveraging machine learning.

Serverless computing is an execution architecture in which application code is run on demand (e.g., cloud computing, function as a service/FaaS, etc.). Serverless computing can simplify the process of deploying code into a production environment. Scaling, capacity planning and maintenance operations may be masked from the developer or operator. Thus, the developer/user is not aware or has to worry of the underlying infrastructure of the computing environment. Additionally, there is a financial benefit to utilizing serverless computing where an organization does not have to maintain a physical server.

Within a serverless computing environment, there are containers which are essentially light weight virtualization architecture. Containers allows developers to deploy individual application inside a portable environment. Each container shares the machine's kernel with other container and thus, are more efficient than virtual machines. Additionally, containers, once deployed, developers do not have to worry about tweaking application configuration due to the environment settings of the OS (operating system).

SUMMARY

Aspects of the present invention disclose a computer-implemented method, and computer system for identifying and predicting usage pattern associated within a serverless environment. The computer implemented method includes, collecting one or more attributes associated with an application on a serverless computing cluster and a user of the application; analyzing the one or more collected attributes; predicting one or more usage patterns based the analyzing; and updating one or more serverless runtime configurations based on the one or more usage patterns.

In another embodiment, the computer system includes one or more computer processors; one or more computer readable storage media; program instructions stored on the one or more computer readable storage media for execution by at least one of the one or more computer processors, the program instructions comprising: program instructions stored on the one or more computer readable storage media for execution by at least one of the one or more computer processors, the program instructions comprising: program instructions to collect one or more attributes associated with an application on a serverless computing cluster and a user of the application; program instructions to analyze the one or more collected attributes; program instructions to predict one or more usage patterns based the analyzing; and program instructions to update one or more serverless runtime configurations based on the one or more usage patterns.

DETAILED DESCRIPTION

Embodiments of the present invention provides an approach for identifying usage patterns on a serverless environment and predict/forecast trends associated with the usage by leveraging machine learning models. The embodiment can collection application data and generate trend lines about various aspects of application usage.

Traditionally, there may need to provision a runtime based on the type of request and does not factor in the type and nature of the application. However, embodiment of the present invention can use application level patterns to predict the load. Scaling is for container and VMs (Virtual Machines) which are continuously running. But in a serverless computing environment, containers and not always running and depends on the application and incoming request whether it should be cold started. Cold containers can be defined as i) starting a container, ii) initializing the action and ii) run the action on the container. Prewarm containers can be defined as (by one less step than cold containers): i) initializing the action and ii) run the action. Warm container can be defined as (two steps less than cold containers): i) run the action.

Other embodiments may recognize the following advantage i) predict the arrival time of the request, type of request, type of load and time of day to reduce cold start time and maintain the resource in running state for the predicted warm time interval once, ii) involves server less compute modules to handle asynchronous requests, iii) do not require the use of source code, and iv) to predict when user is going to request a function call and usage trends to optimize our cloud resources.

In yet another embodiment, the approach may leverage machine learning to identify certain trends in these patterns (e.g., container scheduling, caching, and container reuse, etc.) and use them to dynamically govern these values. Based on the collected application data, the approach can generate trend lines about various aspects of application usage. It is noted that This can be done by using a perceptron based machine learning model such as a Support Vector Machine to determine the values for these values dynamically.

Modern applications have serverless and non-serverless resources. Based on the application, embodiments can anticipate the serverless requests in terms of when they will be submitted, their runtime and duration of execution. Embodiments are not trying to load balance requests. Embodiments are pre-empting the requests and the type of workload and keep the desired runtime (e.g., nodejs, java etc.) ready exactly when it is required, not before nor later and also how long it should be kept running which is prediction of the warm state. These parameters differ with each application. For example, on 25th December, Host Server is anticipating 10000 serverless requests with a 1 min interval by user, Operator, from a clientA (i.e., a large online vendor) to process orders at a certain location. This is different from the paradigm where traditionally, system administrators are always running, and scaling based on load.

A detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

Figure 1:
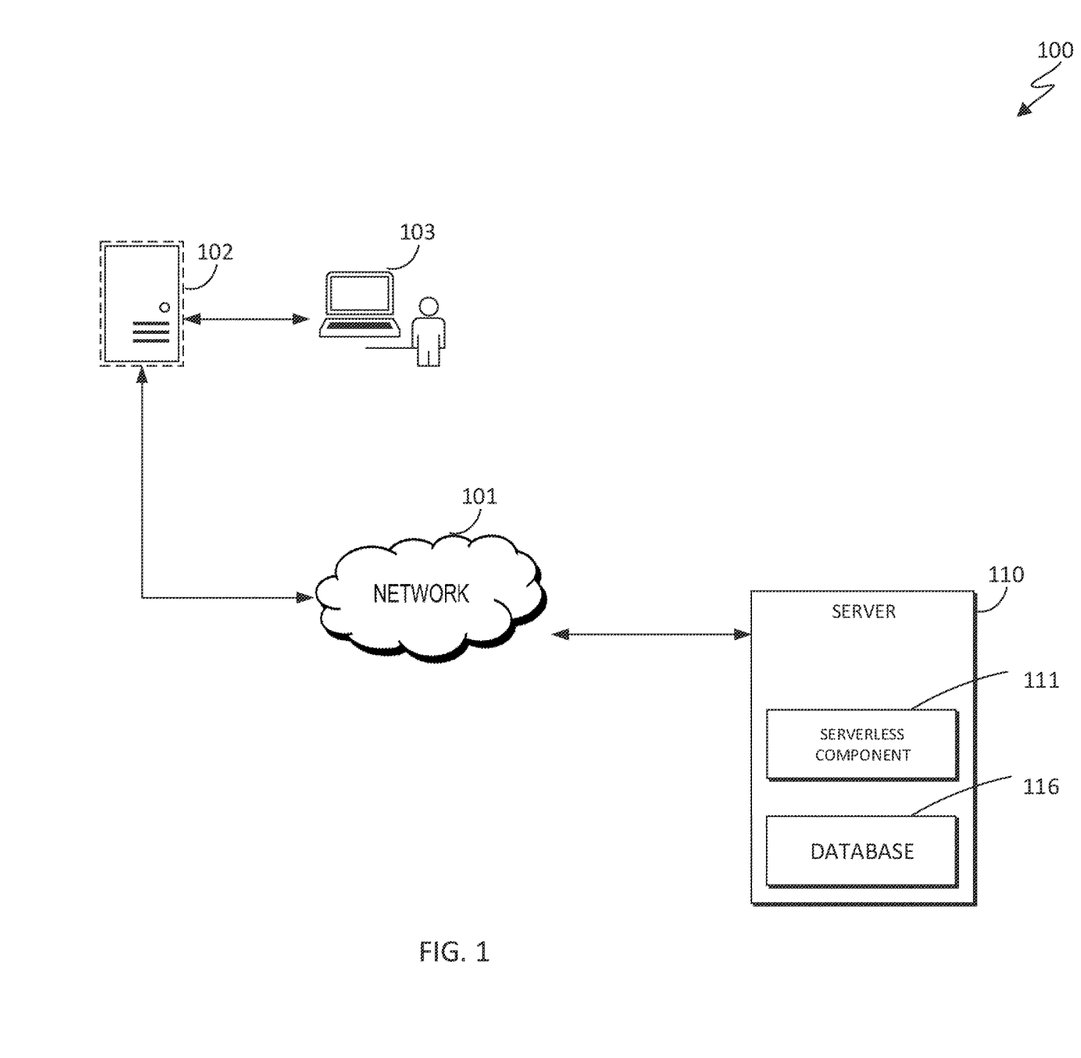
FIG. 1 is a functional block diagram illustrating a topology of a serverless environment, designated as 100, in accordance with an embodiment of the present invention.

FIG. 1 is a functional block diagram illustrating a topology of a serverless environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Serverless environment 100 includes network 101, serverless cluster 102, client computing device 103 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, serverless cluster 102 and other computing devices (not shown) within serverless environment 100. It is noted that other computing devices can include, but is not limited to, client computing device 103 and any electromechanical devices capable of carrying out a series of computing instructions.

Server 110 and serverless cluster 102 can be a standalone computing device, a management server, a web server, a mobile computing device, or any other electronic device or computing system capable of receiving, sending, and processing data. In other embodiments, server 110 and serverless cluster 102 can represent a server computing system utilizing multiple computers as a server system, such as in a cloud computing environment. In another embodiment, server 110 and serverless cluster 102 can be a laptop computer, a tablet computer, a netbook computer, a personal computer (PC), a desktop computer, a personal digital assistant (PDA), a smart phone, or any other programmable electronic device capable of communicating other computing devices (not shown) within 100 via network 101. In another embodiment, server 110 and serverless cluster 102 represents a computing system utilizing clustered computers and components (e.g., database server computers, application server computers, etc.) that act as a single pool of seamless resources when accessed within serverless environment 100.

Client computing device 103 represents a network capable mobile computing device that may receive and transmit confidential data over a wireless network between one or more client/customers utilizing the services/application from serverless cluster 102. Client computing device 103 can be a laptop computer, tablet computer, netbook computer, personal computer (PC), a personal digital assistant (PDA), a smart phone, smart watch (with GPS location) or any programmable electronic device capable of communicating with server computers (e.g., server 110 and/or serverless cluster 102) via network 101, in accordance with an embodiment of the present invention.

Server 110 includes serverless component 111 and database 116.

Database 116 is a repository for data used by serverless component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within serverless environment 100, provided that serverless component 111 has access to database 116. Database 116 may store information associated with, but is not limited to, load requests, traffic pattern, dependencies of serverless environment.

Figure 2:
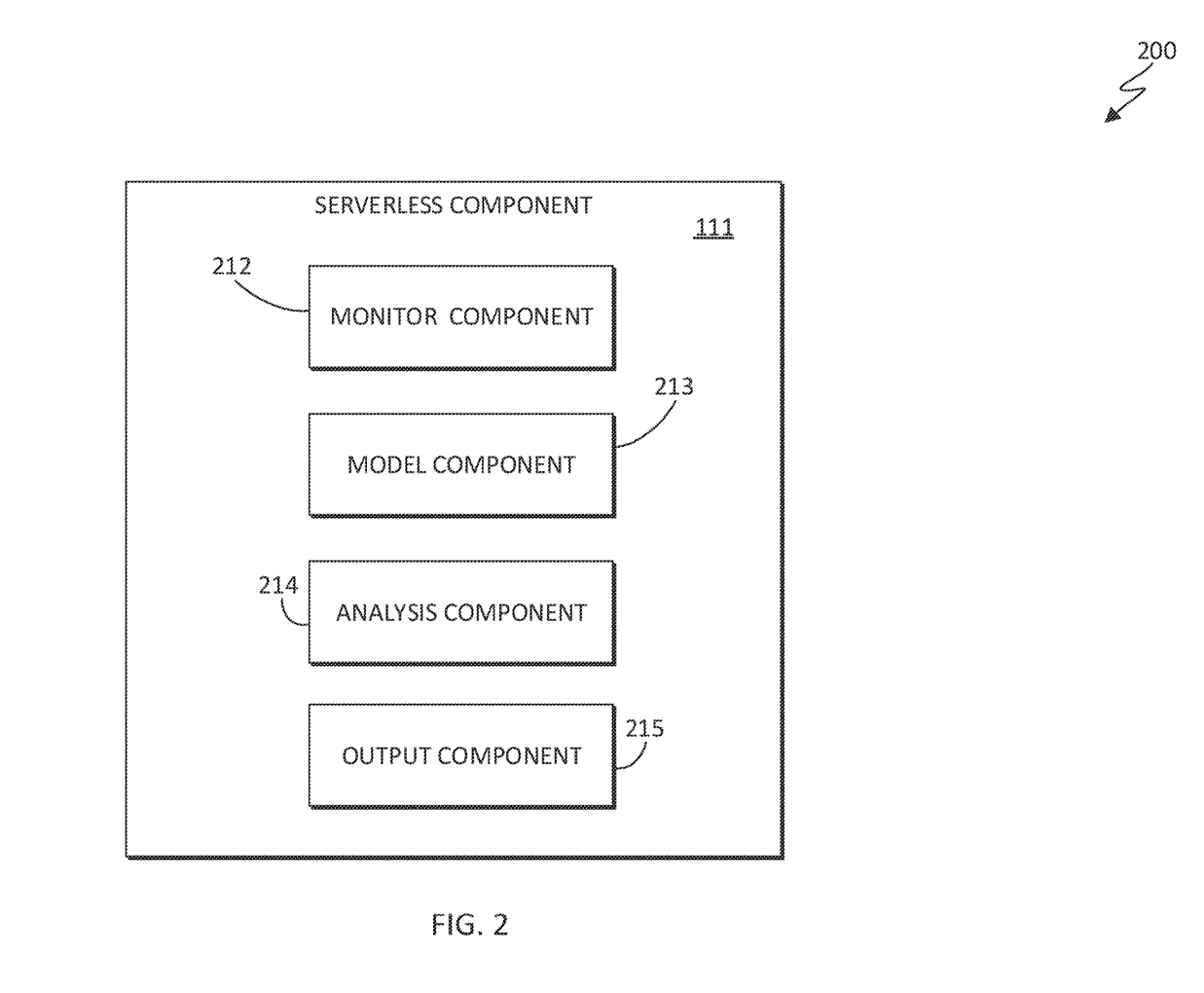
FIG. 2 is a functional block diagram illustrating serverless component, designated as 200, in accordance with an embodiment of the present invention.

FIG. 2 is a functional block diagram illustrating serverless component 111 in accordance with an embodiment of the present invention. In the depicted embodiment, serverless component 111 includes monitor component 212, model component 213, analysis component 214 and output component 215.

As is further described herein below, monitor component 212, of the present invention provides the capability of monitoring traffic patterns, request between serverless cluster 102 and various computing clients (i.e., client computing device 103). Monitor component 212, can monitor the system to generate data about usage, dependencies, the number of requests, the kind of requests, their timing, the initiator of the request. Monitoring data can include tracking the following fields (Table 1):

TABLE 1

| RecordID | Request Type | Minute of the Day | Number of Containers | UserId | Region |
|---|---|---|---|---|---|
| 1 | 1 | 55 | 55 | 1 | 711039 |
| 2 | 4 | 334 | 68 | 1 | 711039 |

TABLE 1-continued

| RecordID | Request Type | Minute of the Day | Number of Containers | UserId | Region |
|---|---|---|---|---|---|
| 3 | 3 | 1062 | 126 | 1 | 711039 |
| 4 | 3 | 706 | 184 | 2 | 71143 |

Other parameters/fields used for tracking can include: Region, User Role, User Location, number of containers, Request Type, Timestamp, Resource Utilization Statistics, Network, Contextual attributes (e.g., season, localization, etc.).

As is further described herein below, model component 213 of the present invention provides the capability of creating models based on the usage pattern of serverless cluster 102 by various computing clients (i.e., client computing device 103). The data received is fed to the machine learning based model at a regular cadence to dynamically keep building the model with the latest data and use this to predict near future user requirements. It is noted that model component 213 can update existing models based on the latest data. Furthermore, analysis component 214 can assist with feedback associated with updating the model's robustness and achieve future accuracy.

In another embodiment, model component 213 can determine the initialization values (i.e., serverless runtime configurations) for container start (e.g., warm and suspend the runtimes) based on the following characteristics: i) profile of vendor, ii) types of functions and iii) region of vendor. For example, if vendor B has 10000 functions on NodeJS, model component 213 can set the initialization values for NodeJS runtimes based on the value of the function at NodeJS and have only a stem pool of nodeJS runtimes. Thus, the value determined is "10" (i.e., keep 10 Nodejs containers ready to server). Its noted that a profile characteristic of the customer (i.e., one or more attributes) can include the following, but is not limited to, size of industry, annual revenue, current user population, location of users and user subscription.

As is further described herein below, analysis component 214, of the present invention provides the capability of analyzing data (e.g., usage pattern, etc.) and predict future requests of serverless cluster 102 from clients (i.e., client computing device 103) based on the models (i.e., from model component 213). Thus, analysis component 214 can work in conjunction with model component 213 to forecast demand requests of serverless cluster 102. The data is dynamically collected and using a machine learning pipeline (e.g., perceptron based, etc.), analysis component 214 along with model component 213 use the information to predict the hot/cold/warm and grace Period for which the container should be run. Furthermore, analysis component 214 can determine which language run times should be maintained or pre allocated. Thus, the need to cold start container is minimized because cold starting containers take the maximum time and can cause performance issues. Serverless runtime configurations can include the following, but it is not limited to, number container available for runtime, number of containers in inactive state, and number of containers in active state. It is noted that any container management technology can be used such as the load balancing, service discovery, service proxy, application mapping and autoscaling capabilities.

In another embodiment, analysis component 214 can run simulations, by leveraging AI, (using real world data or random data) against models created by model component 213. By running simulations against the model, serverless component 111 can predict/forecast usage demands in the future.

As is further described herein below, output component 215, of the present invention provides the capability of outputting the result (e.g., screenshot, word document, pdf, etc.) from analysis component 214 to be available for administers (or someone that manages the serverless computing environment) to make decisions on load requests. For example, based on the forecast and prediction of analysis component 214 of userA, administrator can label userA (of the serverless computing environment) based on trends and then use this behavior to manage caching/gracePeriod for userA. Furthermore, administrator can define a grace period per user (including userA) based on pattern as opposed to a static value for all users. The benefit is to avoid misuse.

In another embodiment, output component 215 can send various commands (e.g., start a container, changing container within a 'stem cell container pool', etc.) to serverless computing environment. For example, based on the predicted model for userB, serverless component 111, through output component 215, can activate a container based on the usage pattern. Thus, userB's application is used most frequently on the weekends for a batch print job, serverless component 111 can start the container containing the print batch job on Saturday morning at 1 AM.

Examples of application A (generic software application requesting CPU time from a serverless environment (i.e., 100) but deployed in different scenarios and region. Hence, the usage pattern varies based on the deployment. Scenario 1, clientA, utilizing a generic railway or flight ticketing app may be deployed by different customers, but AI can detect the proximity and the usage pattern to determine the location and the timing and the type of container needs to be launched. Scenario 1 can leverage data usage of i) proximity (based on traffic origin), ii) CPU vs memory load and iii) time of load.

Scenario 2, a payment gateway app using AI can determine the type of payment and the bank/institution that is being associated based on region preferred choice at run time. Scenario 2 can leverage data usage of i) proximity (based on traffic origin), ii) bank specific driver and iii) type of payment (e.g., debit, credit, Paypal®, etc.).

Scenario 3, a payment gateway app using AI can determine the type of payment and the bank/institution that is being associated based on region preferred choice at run time. Scenario 3 can leverage data usage of i) proximity (based on traffic origin), ii) bank specific driver and iii) type of payment (e.g., debit, credit, Paypal®, etc.).

Figure 3A:
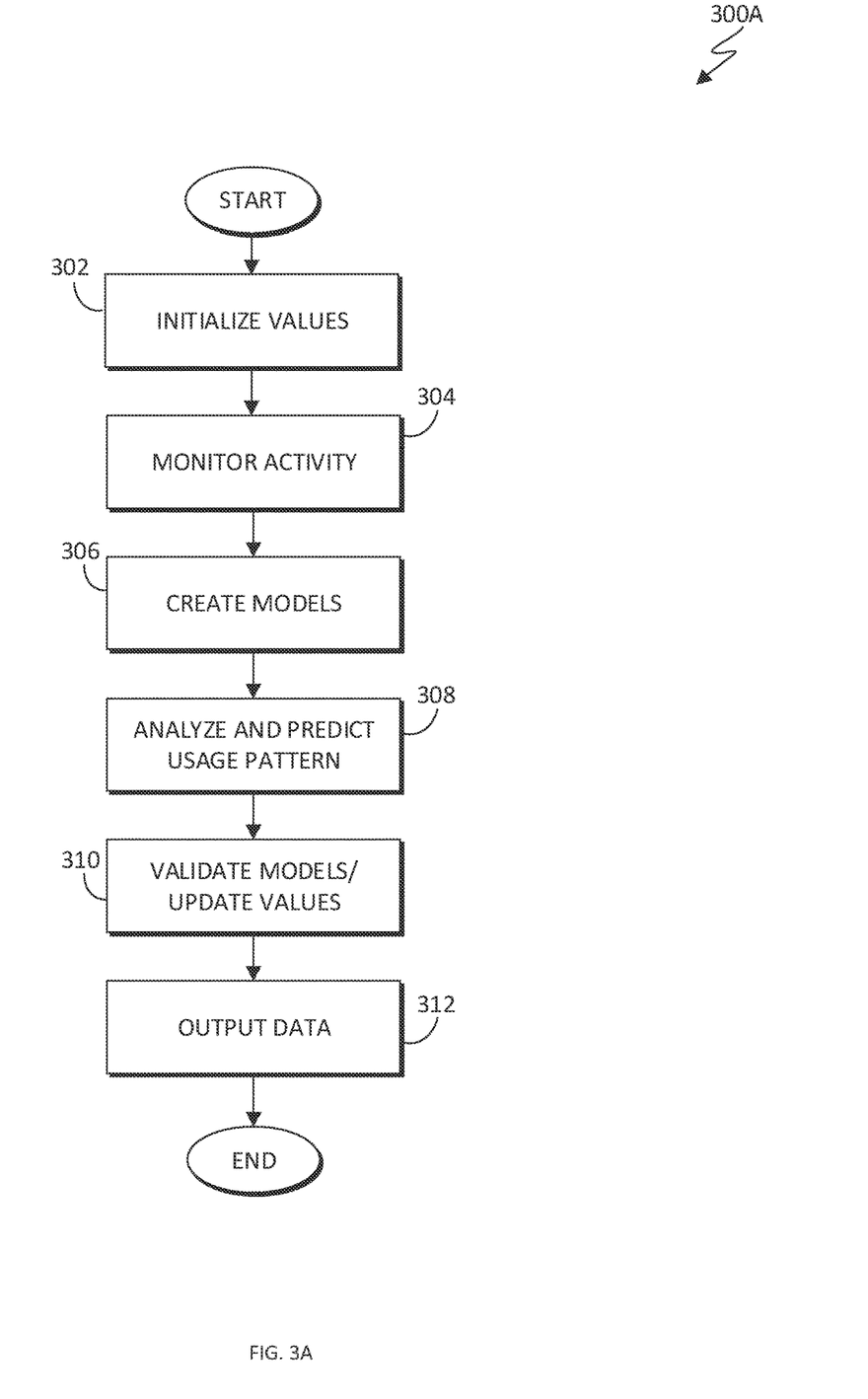
FIG. 3A is a flowchart illustrating the operation of serverless component 111, designated as 300A, in accordance with an embodiment of the present invention.

FIG. 3A is a flowchart illustrating an operation of serverless environment 100, designated as 300A, in accordance with one embodiment of the present invention.

Serverless component 111 initialize values (step 302). In an embodiment, serverless component 111, through model component 213, can set (initialize) values of various containers based on a preset of values. For example, using Scenario 1, serverless component 111 can initialize start up value (i.e. values for warm and suspend runtime of container) such as nodejs containers to "10" available for the client (generic railway/flight ticketing app).

Serverless component 111 monitor activity (step 304). In an embodiment, serverless component 111, through monitor component 212, monitors activities of serverless cluster 102. For example, using Scenario 1, monitor component 212 monitors usage pattern by clientA based on i) proximity, ii) CPU vs memory load and iii) time of load.

Serverless component 111 creates models (step 306). In an embodiment, serverless component 111, through model component 213, creates various models based on the monitored data if there are no existing models for the current user being monitored. For example, model component 213 can create a model for ClientA based on the gathered data (from step 304) and profile characteristics of the customer (e.g., user subscription, location of users, etc.).

Serverless component 111 analyze and predict usage pattern (step 308). In an embodiment, serverless component 111, through analysis component 214, analyzes the models from step 306 and predicts the usage demand for various clients. For example, analysis component 214 analyzes the model for ClientA and forecast usage pattern.

Serverless component 111 validates and updates models (step 310). In an embodiment, serverless component 111, through model component 213, updates existing models based on the monitored data. Some model may require validation based on new data (i.e., model is updated to reflect real world interaction, etc.) For example, ClientA may have a user population of 1000 users during the launch of their ticketing application (i.e., the initial setting for 10 containers). However, after several months, the popularity of the application takes off and there are now 10,000 users of the application. Thus, the setting for 10 containers no longer applies and model component 213 can validate/update the model for ClientA based on the real-world trend.

Serverless component 111 outputs data (step 312). In an embodiment, serverless component 111, through output component 215, outputs one or more predictions for system administrators. The output can be in the form of pdf or screen out GUI to an administrator. For example, using Scenario 1, the output forecast for ClientA based on the current 10,000 users will indicate that the demand will grow including user's population in the next four months. Thus, an administrator can take action or let output component 215 automatically (using machine learning) adjust the settings (e.g., container start and end time, etc.) for the increasing demand on ClientA. Thus, users of ClientA's application will not see a slow down on user experience.

Figure 3B:
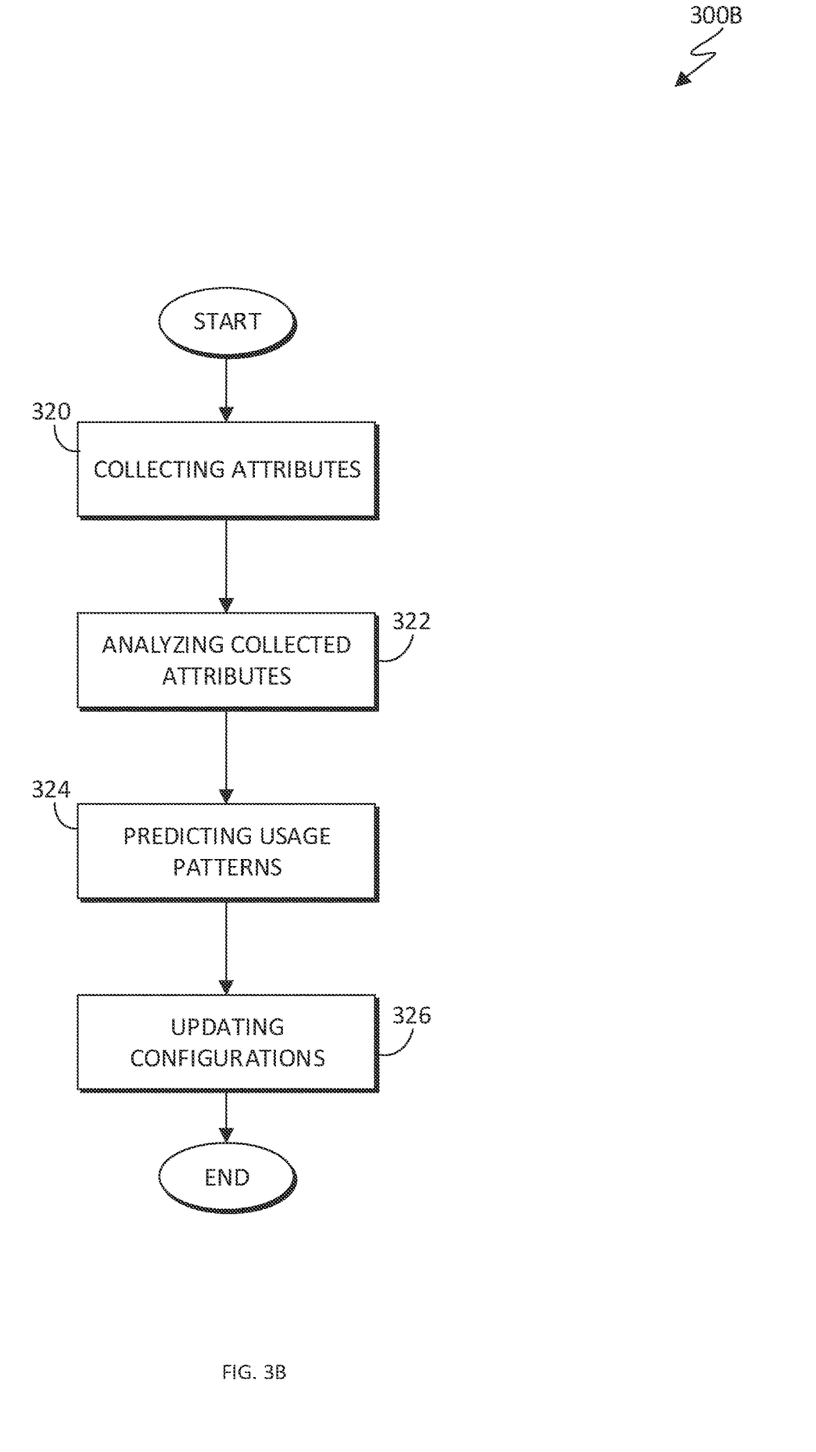
FIG. 3B is a flowchart illustrating an alternative operation of serverless environment 100, designated as 300B, in accordance with another embodiment of the present invention.

FIG. 3B is a flowchart illustrating an alternative operation of serverless environment 100, designated as 300B, in accordance with another embodiment of the present invention.

Serverless component 111 collects attributes (step 320). In an embodiment, serverless component 111, through monitor component 212, collect various attributes from serverless cluster 102. For example, using Scenario 1, monitor component 212 monitors usage pattern by clientA based on i) proximity, ii) CPU vs memory load and iii) time of load.

Serverless component 111 analyzed collected attributes (step 322). In an embodiment, serverless component 111, through model component 213, creates one or more models based on the collected data if there are no existing models for the current user being monitored. For example, model component 213 can create a model for ClientA based on the collected data (from step 320) and profile characteristics of the customer (e.g., user subscription, location of users, etc.).

Serverless component 111 predict usage pattern (step 324). In an embodiment, serverless component 111, through analysis component 214, predicts the usage demand for various clients based on the model. Furthermore, serverless component 111 can run real world simulations against the model. For example, analysis component 214 uses real world data to run a simulation against the model for ClientA and can forecast usage pattern based on the simulation result.

Serverless component 111 update configurations (step 326). In an embodiment, serverless component 111, through output component 215, updates the serverless runtime configuration based on the result of the predicted usage pattern. For example, using Scenario 1, the output forecast for ClientA based on the current 10,000 users will indicate that the demand will grow including user's population in the next four months. Therefore, output component 215 automatically (using machine learning) adjust the settings (e.g., container start and end time, etc.) for the increasing demand on ClientA. Thus, users of ClientA's application will not see a slow down on user experience.

Figure 4:
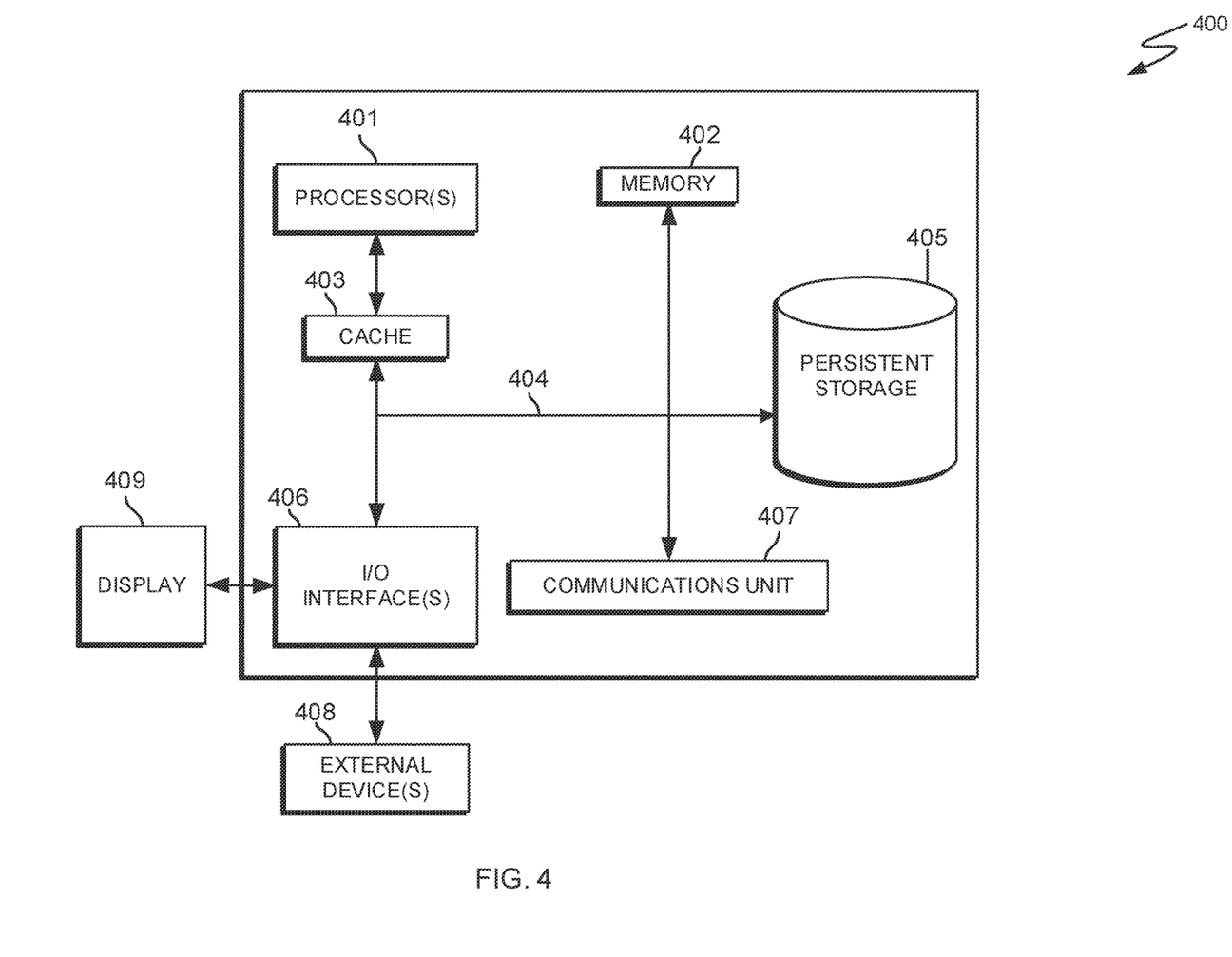
FIG. 4 depicts a block diagram, designated as 400, of components of a server computer capable of executing the serverless component 111 within the serverless environment, of FIG. 1, in accordance with an embodiment of the present invention.

FIG. 4, designated as 400, depicts a block diagram of components of serverless component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data x10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Serverless component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., serverless component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., serverless component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for updating one or more serverless runtime configurations based on predicting usage patterns of a serverless computing cluster, wherein the serverless computing cluster contains programs and applications, the computer-implemented method comprising:
   determining initialization values for starting number of containers, wherein the initialization values comprise of profile of vendors, types of functions and region of the vendors;
   initializing the one or more serverless runtime configurations of an application on a serverless computing cluster based on the initialization values;
   collecting one or more attributes associated with an application on a serverless computing cluster and a user of the application;
   analyzing the one or more collected attributes;
   predicting one or more usage patterns based the analysis;
   updating one or more serverless runtime configurations based on the one or more usage patterns;
   adjusting automatically, the one or more serverless runtime configurations based on the one or more usage patterns;
   determining whether one or more usage models exist based on the user; and
   responsive to the usage model does exist, updating the one or more usage models based on the collection and the analysis.

2. The computer-implemented method of claim 1, wherein updating the one or more serverless runtime configurations based on the one or more usage patterns further comprises:
   setting, by leveraging machine learning, the one or more serverless runtime configurations based on the one or more usage patterns.

3. The computer-implemented method of claim 1, wherein the one or more serverless runtime configurations further comprise, number of containers available for runtime, number of containers in an inactive state, and number of containers in an active state.

4. The computer-implemented method of claim 1, wherein the one or more attributes further comprise a region, a user role, a user location, number of containers, a request type, a timestamp, resource utilization statistics, network, and contextual attributes.

5. The computer-implemented method of claim 4, wherein the contextual attributes further comprise of a season and a localization.

6. The computer-implemented method of claim 1, wherein analyzing the one or more collected attributes further comprises:
   creating one or more models based on the collected attributes associated with the user; and
   running one or more real world simulations against the one or more models.

7. The computer-implemented method of claim 6, wherein predicting the one or more usage patterns based the analysis further comprises:
   forecasting the one or more usage patterns based on running one or more real world simulations against the one or more models.

8. The computer-implemented method of claim 6, wherein creating the one or more models is based on leveraging perceptron based machine learning model technique.

9. A computer system for updating one or more serverless runtime configurations based on predicting usage patterns of a serverless computing cluster, wherein the serverless computing cluster contains programs and applications, the computer system comprising:
   one or more computer processors;
   one or more computer readable storage media;
   program instructions stored on the one or more computer readable storage media for execution by at least one of the one or more computer processors, the program instructions comprising:
   program instructions to determine an initialization values for starting number of containers, wherein the initialization values comprise of profile of vendors, types of functions and region of the vendors;
   program instructions to initialize one or more serverless runtime configurations of an application on a serverless computing cluster based on the initialization values;
   program instructions to collect one or more attributes associated with an application on a serverless computing cluster and a user of the application;
   program instructions to analyze the one or more collected attributes;
   program instructions to predict one or more usage patterns based the analyzing;
   program instructions to update one or more serverless runtime configurations based on the one or more usage patterns;

program instructions to adjust automatically, the one or more serverless runtime configurations based on the one or more usage patterns;

program instructions to determine whether one or more usage models exist based on the user; and responsive to the usage model does exist, program instructions to update the one or more usage models based on the collection and the analysis.

10. The computer system of claim 9, wherein program instructions to update the one or more serverless runtime configurations based on the one or more usage patterns further comprises:

program instructions to set, by leveraging machine learning, the one or more serverless runtime configurations based on the one or more usage patterns.

11. The computer system of claim 9, wherein the one or more serverless runtime configurations further comprises of number containers available for runtime, number of containers in an inactive state, and number of containers in an active state.

12. The computer system of claim 9, wherein the one or more attributes further comprise a region, a user role, a user location, number of containers, a request type, a timestamp, resource utilization statistics, network, and contextual attributes.

13. The computer system of claim 12, wherein contextual attributes further comprise of a season and a localization.

14. The computer system of claim 9, wherein program instructions to analyze the one or more collected attributes further comprises:

program instructions to create one or more models based on the collected attributes associated with the user; and program instructions to run one or more real world simulations against the one or more models.

15. The computer system of claim 14, wherein program instructions to predict one or more usage patterns based the analyzing further comprises:

program instructions to forecast the one or more usage patterns based on running the one or more real world simulations against the one or more models.

16. The computer system of claim 14, wherein program instructions to create one or more models are based on leveraging perceptron based machine learning model technique.

* * * * *